(12) United States Patent
Fu et al.

(10) Patent No.: US 9,959,149 B1
(45) Date of Patent: May 1, 2018

(54) SERVER FARM AND METHOD FOR OPERATING THE SAME

(71) Applicant: City University of Hong Kong, Kowloon (HK)

(72) Inventors: Jing Fu, New Territories (HK); William Morgan, Balwyn (AU); Jun Guo, New Territories (HK); Moshe Zukerman, New Territories (HK); Wing Ming Eric Wong, Kowloon (HK)

(73) Assignee: City University of Hong Kong, Kowloon (HK)

( * ) Notice: Subject to any disclaimer, the term of this patent is extended or adjusted under 35 U.S.C. 154(b) by 38 days.

(21) Appl. No.: 15/290,106

(22) Filed: Oct. 11, 2016

(51) Int. Cl.
*G06F 9/46* (2006.01)
*G06F 9/50* (2006.01)

(52) U.S. Cl.
CPC .......... *G06F 9/5094* (2013.01); *G06F 9/5027* (2013.01)

(58) Field of Classification Search
None
See application file for complete search history.

(56) References Cited

U.S. PATENT DOCUMENTS

| 2008/0141048 | A1* | 6/2008 | Palmer | H04L 67/1008 |
| | | | | 713/300 |
| 2009/0187782 | A1* | 7/2009 | Greene | G06Q 10/00 |
| | | | | 713/340 |

OTHER PUBLICATIONS

Jing et al. (NPL: Energy-Efficient Heuristics for Insensitive Job Assignment in Processor-Sharing Server Farms, Dec. 2015).*
J. Fu, B. Moran, J. Guo, E. W. M. Wong and M. Zukerman, "Asymptotically Optimal Job Assignment for Energy-Efficient Processor-Sharing Server Farms", submitted, pp. 1-16, Jan. 2016.
Z. Rosberg, Y. Peng, J. Fu, J. Guo, E. W. M. Wong and M. Zukerman, "Insensitive Job Assignment with Throughput and Energy Criteria for Processor-Sharing Server Farms," IEEE/ACM Transactions on Networking, vol. 22, No. 4, pp. 1257-1270, Aug. 2014.
E. W. M. Wong; J. Fu; J. Guo; M. Zukerman; "System and method for operating a server farm", U.S. Appl. No. 15/067,370, filed Mar. 2016.

* cited by examiner

*Primary Examiner* — Sisley Kim
(74) *Attorney, Agent, or Firm* — Renner Kenner Greive Bobak Taylor & Weber (57) ABSTRACT

A method for operating a server farm with a plurality of servers operably connected with each other includes: receiving a job request of a computational task to be handled by the server farm; determining, from the plurality of servers, one or more servers operable to accept the job request; determining a respective effective energy efficiency value associated with at least the one or more servers; and assigning the computational task to a server with the highest effective energy efficiency value. The effective energy efficiency value is defined by a service rate of the respective server divided by a difference between an energy consumption rate value when the respective server is busy and an energy consumption rate value when the respective server is idle. The present invention also relates to a server farm operated by the method.

20 Claims, 6 Drawing Sheets

SERVER FARM AND METHOD FOR OPERATING THE SAME

TECHNICAL FIELD

The present invention relates to a system and method for operating a server farm, and particularly, although not exclusively, to an asymptotically optimal job assignment method for operating an energy-efficient processor sharing server farms.

BACKGROUND

Data centers with server farms are essential to the functioning of computer systems in different applications and sectors in the modern economy. Generally, server farms in data centers include a large number of servers that consume power during operation to process and handle jobs or computational tasks. These servers account for the major portion of energy consumption of data centers.

Since excessive power consumption in server farm may increase operation cost and cause environmental concerns, various approaches have been proposed to optimize energy utilization in server farms. In one example, speed scaling is applied to control server speed. In another example, right-sizing of server farms is applied by powering servers on/off according to traffic load.

Rapid improvements in computer hardware have resulted in frequent upgrades of parts of the server farms, and this has led to server farms with different computer resources (heterogeneous servers) being deployed. The heterogeneity of servers in server farm significantly complicates the optimization of energy utilization. Therefore, there remains a need for server farm designers and/or operators to devise an optimal strategy in operating and managing server farms so as to conserve energy and maximize the effective energy efficiency of server farms.

SUMMARY OF THE INVENTION

In accordance with a first aspect of the present invention, there is provided a method for operating a server farm with a plurality of servers operably connected with each other, the method comprising the steps of: receiving a job request of a computational task to be handled by the server farm; determining, from the plurality of servers, one or more servers operable to accept the job request; determining a respective effective energy efficiency value associated with at least the one or more servers; and assigning the computational task to a server with the highest effective energy efficiency value; wherein the effective energy efficiency value is defined by: a service rate of the respective server divided by a difference between an energy consumption rate value when the respective server is busy (performing computational tasks) and an energy consumption rate value when the respective server is idle (not performing computational tasks). Preferably, the method steps can be in different order as listed as long as they could be logically rearranged. For example, the job request could be received after the one or more servers operable to accept the job request are determined. Optionally, the respective effective energy efficiency values associated with all of the servers, instead of only those operable to accept the job request, are determined.

In one embodiment of the first aspect, the method further comprises sorting the one or more servers according to the respective determined effective energy efficiency values. The sorting could be in ascending or descending order.

In one embodiment of the first aspect, the step of determining from the plurality of servers one or more servers operable to accept the job request comprises determining, from the plurality of servers, all servers operable to accept the job request.

In one embodiment of the first aspect, the plurality of servers cannot be powered off during operation of the server farm. In one embodiment of the first aspect, the plurality of servers cannot be powered off during operation.

In one embodiment of the first aspect, assignment of computation tasks in the server farm is substantially independent of an arrival rate of computation tasks at the server farm.

In one embodiment of the first aspect, assignment of computation tasks in the server farm is substantially independent of a respective size of the computation tasks received at the server farm.

In one embodiment of the first aspect, the plurality of servers each includes a finite buffer for queuing job requests.

In one embodiment of the first aspect, the one or more servers operable to accept the job request each has at least one vacancy in their respective buffer.

In one embodiment of the first aspect, the server farm is heterogeneous in that some or all of the plurality of servers can have different server speeds, energy consumption rates, and/or buffer sizes.

In one embodiment of the first aspect, the server farm is a non-jockeying server farm in which computational task being handled by one of the plurality of servers cannot be reassigned to other servers.

In accordance with a second aspect of the present invention, there is provided a system for operating a server farm with a plurality of servers operably connected with each other, the system comprising one or more processors arranged to: receive a job request of a computational task to be handled by the server farm; determine, from the plurality of servers, one or more servers operable to accept the job request; determine a respective effective energy efficiency value associated with at least the one or more servers; and assign the computational task to a server with the highest effective energy efficiency value; wherein the effective energy efficiency value is defined by: a service rate of the respective server divided by a difference between an energy consumption rate value when the respective server is busy (performing computational tasks) and an energy consumption rate value when the respective server is idle (not performing computational tasks).

In one embodiment of the second aspect, the one or more processors may be incorporated in one or more servers in the server farm. In another embodiment, the one or more processors may be arranged external to the server farm, but are operably connected with the servers in the server farm.

In accordance with a third aspect of the present invention, there is provided a server farm comprising: a plurality of servers operably connected with each other; one or more processor operably connected with the plurality of server, the one or more processor being arranged to: receive a job request of a computational task to be handled by the server farm; determine, from the plurality of servers, one or more servers operable to accept the job request; determine a respective effective energy efficiency value associated with at least the one or more servers; and assign the computational task to a server with the highest effective energy efficiency value; wherein the effective energy efficiency value is defined by: a service rate of the respective server divided by a difference between an energy consumption rate value when the respective server is busy (performing computational tasks) and an energy consumption rate value when the respective server is idle (not performing computational tasks).

In one embodiment of the third aspect, the one or more processor is further operable to sort the one or more servers according to the respective determined effective energy efficiency values.

In one embodiment of the third aspect, the one or more processor is further operable to: determine, from the plurality of servers, all servers operable to accept the job request.

In one embodiment of the third aspect, the plurality of servers cannot be powered off during operation of the server farm.

In one embodiment of the third aspect, the one or more processor is arranged such that assignment of computation tasks in the server farm is substantially independent of an arrival rate of computation tasks at the server farm.

In one embodiment of the third aspect, the one or more processor is arranged such that assignment of computation tasks in the server farm is substantially independent of a respective size of the computation tasks received at the server farm.

In one embodiment of the third aspect, the plurality of servers each includes a finite buffer for queuing job requests; and wherein the one or more servers operable to accept the job request each has at least one vacancy in their respective buffer.

In one embodiment of the third aspect, the server farm is heterogeneous in that the plurality of servers can have different server speeds, energy consumption rates, and/or buffer sizes.

In one embodiment of the third aspect, the server farm is a non-jockeying server farm in which computational task being handled by one of the plurality of servers cannot be reassigned to other servers.

In one embodiment of the third aspect, the one or more processors are incorporated in at least one of the plurality of servers.

In accordance with a fourth aspect of the present invention, there is provided a non-transient computer readable medium for storing computer instructions that, when executed by one or more processors, causes the one or more processors to perform a method for operating a server farm with a plurality of servers operably connected with each other, the method comprising the steps of: receiving a job request of a computational task to be handled by the server farm; determining, from the plurality of servers, one or more servers operable to accept the job request; determining a respective effective energy efficiency value associated with at least the one or more servers; and assigning the computational task to a server with the highest effective energy efficiency value; wherein the effective energy efficiency value is defined by: a service rate of the respective server divided by a difference between an energy consumption rate value when the respective server is busy (performing computational tasks) and an energy consumption rate value when the respective server is idle (not performing computational tasks).

It is an object of the present invention to address the above needs, to overcome or substantially ameliorate the above disadvantages or, more generally, to provide an improved method for assigning jobs in a large-scale server farm by taking into account the power consumed by the servers when idle.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
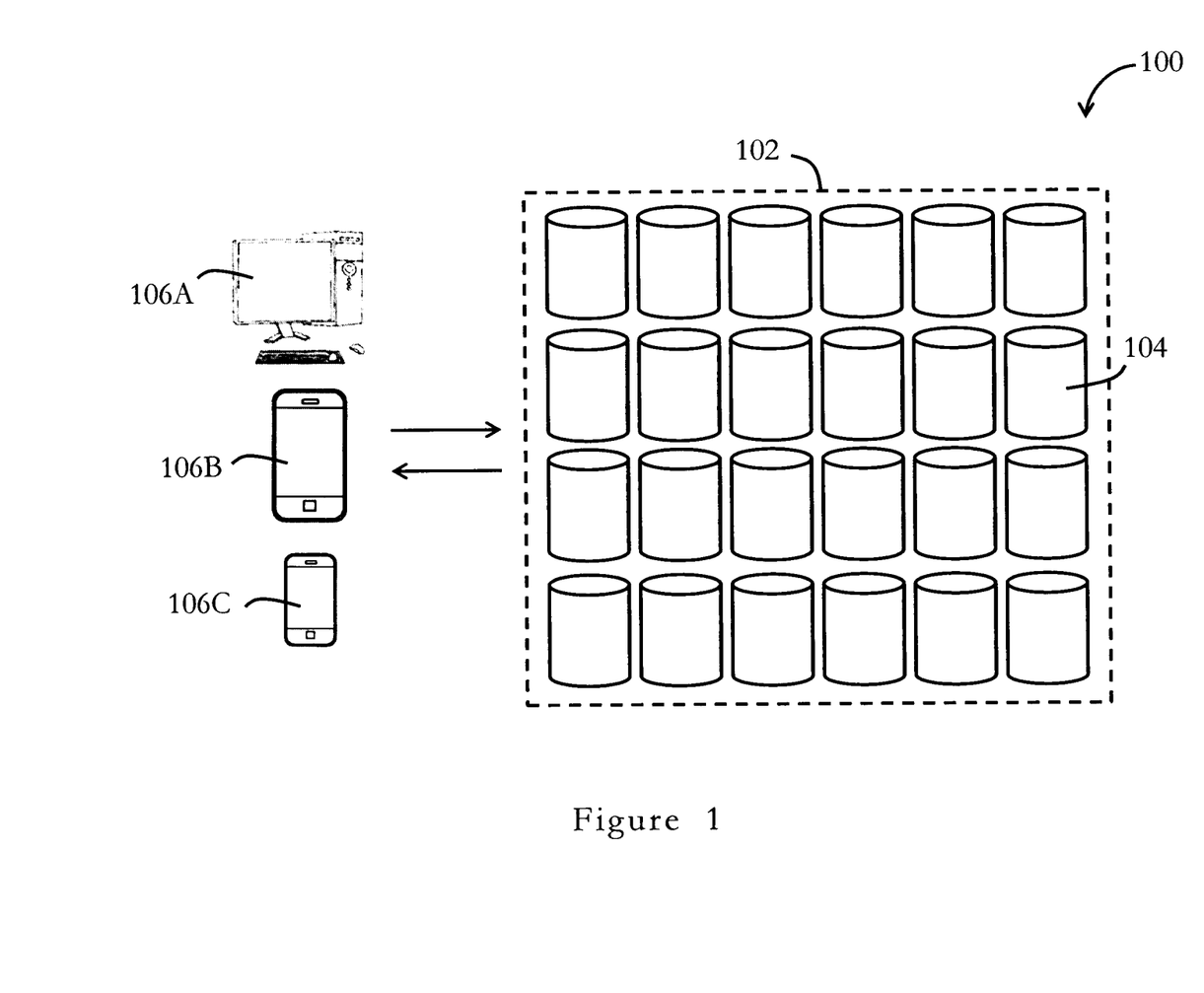
FIG. 1 is a schematic diagram of an operation environment of a server farm in accordance with one embodiment of the present invention.

FIG. 1 shows an operation environment 100 of a server farm in accordance with one embodiment of the present invention. The environment 100 includes a server farm 102 with servers 104 operably connected with each other, for example, through one or more communication links or buses (not shown). Each server 104 is generally an information handling system that is designed to perform computational tasks such as storing, managing, and/or processing information and data. In one embodiment, the server 104 may be any types of device or apparatus that is operable to store, send, receive, and/or forward information and data. The servers 104 in the environment 100 may optionally be connected to other networks, such as the Internet or a cloud-computing network (not shown), for exchanging, storing, or retrieving information. Each server is preferably operable independently. In one example, two or more of the servers 104 in the server farm 102 may be linked together to perform computation functions. The server farm could be a single server farm, or could be a cluster of server farms that are operably connected with each other.

The environment 100 in FIG. 1 includes computing devices that can be connected to the server over a communication network, such as the Internet or a cloud computing network, for bi-directional communication and information/data exchange. As shown in FIG. 1, the computing device may be a desktop computer 106A, a portable computing device 106B, a mobile device 106C, etc., and can be controlled by a user or by another computing device to perform computation functions. The computing device 106A, 106B, 106C is operable to transmit to a server management module a job request of a computational task to be performed by one or more servers 104 in the server farm 102. In one example, the computational task is to retrieve information stored on or accessible to the servers 104 in the farm 102. In the present embodiment, the server management module may be implemented by one or more processors in the one or more servers 104 of the server farm 102, or by other processing system outside the server farm 102. The server management module may be implemented entirely by hardware resources, entirely by software resources, or by both hardware and software resources. The server management module may be operated by an administration personnel for controlling operation of the server farm 102.

Figure 2:
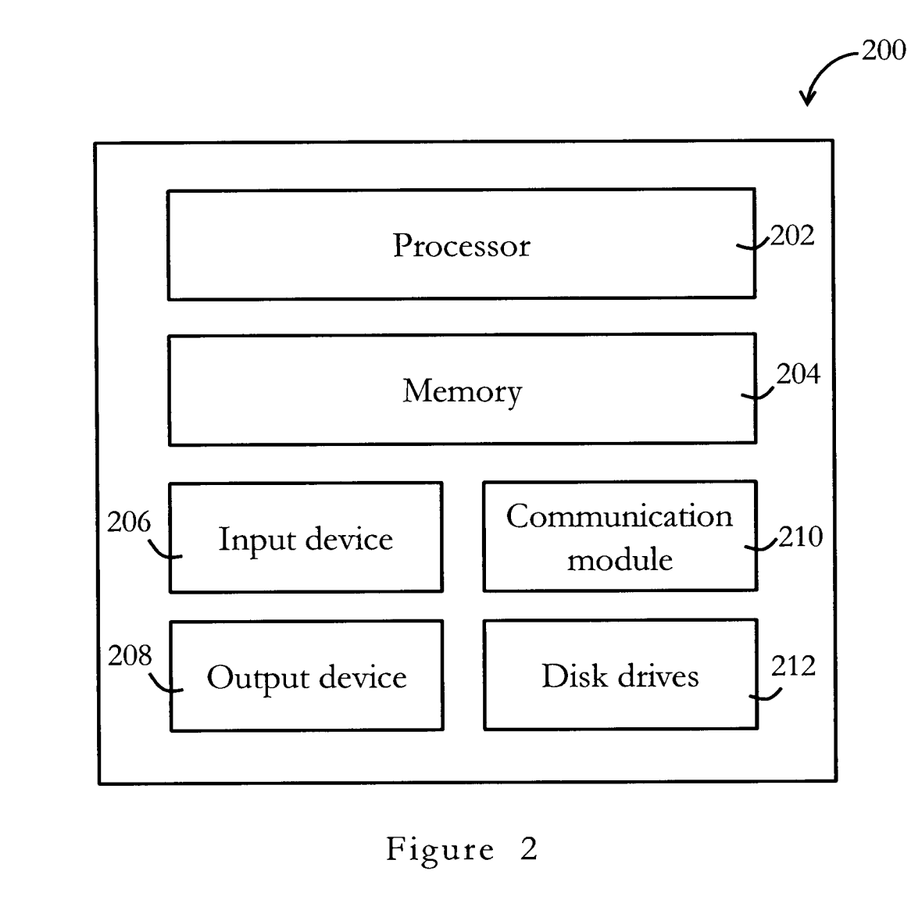
FIG. 2 is a functional block diagram of an information handling system in accordance with one embodiment of the present invention.

Referring to FIG. 2, there is shown a schematic diagram of an exemplary information handling system 200 that can be used as a server or other information processing systems in one embodiment of the present invention. Preferably, the server 200 may have different configurations, and it generally comprises suitable components necessary to receive, store and execute appropriate computer instructions or codes. The main components of the server 200 are a processing unit 202 and a memory unit 204. The processing unit 202 is a processor such as a CPU, an MCU, etc. The memory unit 204 may include a volatile memory unit (such as RAM), a non-volatile unit (such as ROM, EPROM, EEPROM and flash memory) or both. Preferably, the server 200 further includes one or more input devices 206 such as a keyboard, a mouse, a stylus, a microphone, a tactile input device (e.g., touch sensitive screen) and a video input device (e.g., camera). The server 200 may further include one or more output devices 208 such as one or more displays, speakers, disk drives, and printers. The displays may be a liquid crystal display, a light emitting display or any other suitable display that may or may not be touch sensitive. The server 200 may further include one or more disk drives 212 which may encompass solid state drives, hard disk drives, optical drives and/or magnetic tape drives. A suitable operating system may be installed in the server 200, e.g., on the disk drive 212 or in the memory unit 204 of the server 200. The memory unit 204 and the disk drive 212 may be operated by the processing unit 202. The server 200 also preferably includes a communication module 210 for establishing one or more communication links (not shown) with one or more other computing devices such as a server, personal computers, terminals, wireless or handheld computing devices. The communication module 210 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 202, the memory unit 204, and optionally the input devices 206, the output devices 208, the communication module 210 and the disk drives 212 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the server 200 shown in FIG. 2 is merely exemplary, and that different servers 200 may have different configurations and still be applicable in the present invention.

Figure 3:
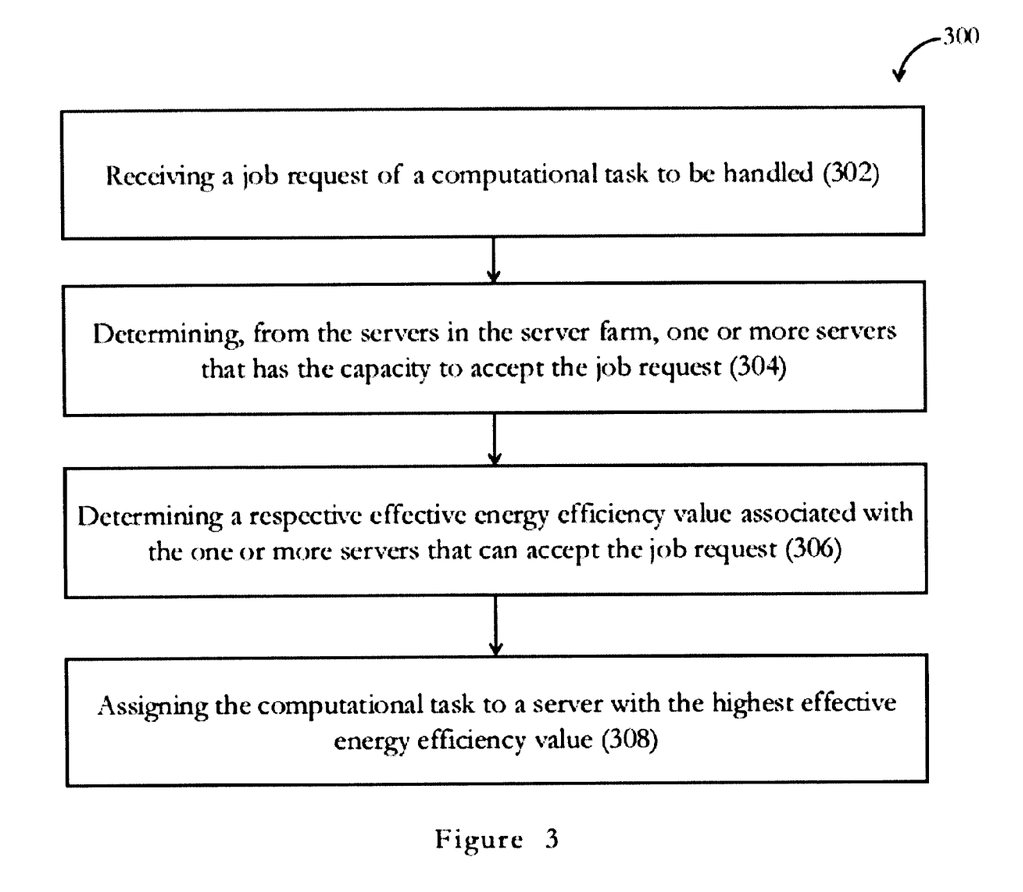
FIG. 3 is a flow diagram illustrating a job assignment method, also referred to as the most-energy-efficient-available-server-first accounting for idle power (MAIP) job assignment method, for operating a server farm in accordance with one embodiment of the present invention.

FIG. 3 shows a flow diagram illustrating a job assignment method 300 in accordance with one embodiment of the present invention, also referred to as the most-energy-efficient-available-server-first accounting for idle power (MAIP) job assignment method, for operating a server farm. The server farm in which the method operates may be similar to the server farm 102 of FIG. 1, with a number of servers operably connected with each other. Each of the servers in the server farm may include a finite buffer for queuing job requests. The job assignment method 300 may be implemented by one or more processors or servers within or outside the server farm. In one embodiment, the method 300 includes the step 302 of receiving a job request of a computational task to be handled by the server farm. The method 300 further includes the step 304 of determining, from all of the servers, one or more servers that is operable to accept the job request. Preferably, the one or more servers operable to accept the job request are servers that have at least one vacancy in their respective buffer. In a preferred embodiment, all servers operable to accept the job request are identified in step 304. After determining the servers operable to accept the job request, the method 300 proceeds to step 306, in which respective effective energy efficiency values associated with the one or more servers operable to accept the job request are determined. In the present invention, the effective energy efficiency value is defined as: a service rate of the respective server divided by a difference between an energy consumption rate value when the respective server is busy and an energy consumption rate value when the respective server is idle. Optionally, the method 300 further includes the step of sorting the one or more servers according to the respective determined effective energy efficiency values. After determining the respective effective energy efficiency values, the method proceeds to step 308, in which the computational task to be performed is assigned to a server with the highest effective energy efficiency value. Preferably, in method 300, assignment of computational tasks in the server farm is substantially independent of an arrival rate of computation tasks at the server farm/a respective size of the computation tasks received at the server farm.

A person skilled in the art would appreciate that the steps 302, 304, 306, 308 in method 300 need not be performed in the order as listed, but can be in any other order as long as it is logical. For example, steps 304 and 306 can be performed before step 302.

In a preferred embodiment, the server farm is heterogeneous in that the servers can have different server speeds, energy consumption rates, and/or buffer sizes. All servers in the farm, even the idle ones, have non-negligible energy consumption rate. Preferably, the server farm is a non-jockeying server farm in which computational task being handled by one of the servers cannot be reassigned to other servers. In one embodiment, the plurality of servers cannot be powered off during operation of the server farm. This could refer to, in practice, periods of operation during which no powering off of the servers takes place. In one embodiment, method 300 may be combined with a right-sizing technique by powering off idle servers, although frequent powering off/on increases wear and tear and the need for costly replacement and maintenance.

In a preferred embodiment, the processor sharing (PS) discipline is imposed on each queue of the servers, so that all jobs on the same queue share the processing capacity and are served at the same rate. This arrangement avoids unfair delays for those jobs that are preceded by extremely large jobs, making it an appropriate model for web server farms, where job-size distributions are highly variable. The finite buffer size queuing model with PS discipline can be applied in situations where a minimum service rate is required for processing a job in the system.

In one embodiment, the server farm is a large-scale realistically-dimensioned server farm that cannot reject a job if it has buffer space available. Although in situations where a server farm has some inefficient servers and rejection of some jobs might save energy, this is not permitted in some embodiments of the present invention.

An objective function of the optimization of the present invention is the energy efficiency of a server farm, defined as the ratio of the long-run expected throughput divided by the expected energy consumption rate. This objective function represents the amount of useful work (e.g., data rate, throughput, processes per second) per watt, and is well-accepted as a performance measure in ICT applications.

I—System Model

The following table (Table I) includes definition of some of the symbols used in the following description.

TABLE I

| Symbol | Definition |
|---|---|
| $\mathcal{K}$ | Set of servers in the system |
| K | Number of servers in the system |
| $B_j$ | Buffer size of server j |
| $\mu_j$ | Service rate of server j |
| $\varepsilon_{j_0}$ | Energy consumption rate of server j when it is busy |
| $\varepsilon_j^o$ | Energy consumption rate of server j when it is idle |
| $\mu_j/(\varepsilon_j - \varepsilon_j^o)$ | Effective energy efficiency of server j |
| $\lambda$ | Job arrival rate |
| $\mathcal{L}^\phi$ | Job throughput of the system under policy $\phi$ |
| $\varepsilon^\phi$ | Energy consumption rate of the system under policy $\phi$ |
| $\mathcal{L}^\phi/\varepsilon^\phi$ | Energy efficiency of the system under policy $\phi$ |

The present embodiment considers a heterogeneous server farm modeled as a multi-queue system with reassignment of incomplete jobs (e.g. jobs being processed) disallowed. In this embodiment, the server farm has K≥2 servers, forming the set $\mathcal{K} = \{1, 2, \ldots, K\}$. These servers are characterized by their service rates, energy consumption rates, and buffer sizes. For $j \in \mathcal{K}$, the service rate for server j is denoted by $\mu_j$. The energy consumption rate of server j is $\epsilon_j$ when it is busy and $\epsilon_j^0$ when it is idle, where $\epsilon_j > \epsilon_j^0 \geq 0$. In the present invention, the ratio $\mu_j/(\epsilon_j - \epsilon_j^0)$ is referred to as the effective energy efficiency of server j. In one embodiment, the buffer size of server j is denoted by $B_j \geq 2$.

Preferably, job arrivals follow a Poisson process with rate $\lambda$, indicating the average number of arrivals per time unit. An arriving job is assigned to one of the servers with at least one vacant slot in its buffer, subject to the control of an assignment policy $\phi$. In one embodiment, if all buffers are full, the arriving job is lost.

In the present embodiment, it is assumed that job sizes are independent and identically distributed. The average size of jobs is normalized, without loss of generality, to one. Preferably, each server j serves its jobs at a total rate of $\mu_j$ using the PS service discipline.

The following consideration is limited to realistic cases by assuming that the ratio of the arrival rate to the total service rate, $$\rho \stackrel{def}{=} \lambda \bigg/ \sum_{j=1}^{K} \mu_j,$$

is sufficiently large to be economically justifiable but not too large to violate the required quality of service (QoS). In the following, $\rho$ is referred to as the normalized offered traffic.

The job throughput of the system under policy $\phi$, which is equivalent to the long-run average job departure rate, is denoted by $\mathcal{L}^\phi$. The power consumption of the system under policy $\phi$, which is equivalent to the long-run average energy consumption rate, is denoted by $\epsilon^\phi$. By definition, $\mathcal{L}^\phi/\epsilon^\phi$ is the energy efficiency of the system under policy $\phi$.

II—MAIP Job Assignment Method

In the present embodiment, the server farm managing module makes decisions at arrival events to assign a new job to one of the servers (queues) in the server farm (queuing system). A server selected to accept new jobs is called a tagged server, while all other servers are untagged. If all of the servers are full, i.e., has no capacity to accept new job requests, then no server is tagged at that time and new arrivals are blocked until completion of some job in the system.

Preferably, MAIP is obtained by considering the effective energy efficiency of servers, taking into account the effect of idle power, i.e., energy consumption rate when the server is idle. Preferably, the method in the present embodiment always selects a server with the highest effective energy efficiency among all servers that are not full. Such a server is regarded as the most energy-efficient server available to accept new jobs.

A simple explanation of MAIP of the present embodiment is as follows. Consider a system with two servers only, where $\mu_1 = \mu_2 = 1$, $\epsilon_1 = 2$, $\epsilon_1^0 = 1$, $\epsilon_2 = 2.5$, and $\epsilon_2^0 = 2$. It is clear that in this example $\epsilon_1 < \epsilon_2$ and $\epsilon_1^0 < \epsilon_2^0$. If a job arrives when both servers are idle, the scheduler has two choices:

(1) Assigning the job to server 1 makes server 1 busy. And the energy consumption rate of the whole system becomes $\epsilon_1 + \epsilon_2^0 = 4$.

(2) Assigning the job to server 2 makes server 2 busy. And the energy consumption rate of the whole system becomes $\epsilon_2 + \epsilon_1^0 = 3.5$.

Since $(\epsilon_1 + \epsilon_2^0) > (\epsilon_2 + \epsilon_1^0)$, which is equivalently $(\epsilon_1 - \epsilon_1^0) > (\epsilon_2 - \epsilon_2^0)$, and since both servers have the same service rate, choosing server 2 for serving the job in this particular example turns out to be better in terms of the energy efficiency of the system, despite the fact that server 2 consumes more power when busy than server 1 does.

In examples where power consumption of idle servers in a system is not necessarily negligible, the energy used by the system can be categorized into two parts, a productive part and an unproductive part. The productive part contributes to job throughput, whereas the unproductive part is a waste of energy. For a server j, when it is idle, the service rate is 0 accompanied by an energy consumption rate of $\epsilon_j^0$; when it is busy, the service rate becomes $\mu_j$ and the energy consumption rate increases to $\epsilon_j$. The additional service rate $\mu_j - 0$ is considered as a reward at the cost of an additional energy consumption rate $\epsilon_j - \epsilon_j^0$. In other words, if jobs are assigned to server j, the productive power used to support the service rate $\mu_j$ is effectively $\epsilon_j - \epsilon_j^0$. In the design of MAIP in one embodiment of the present invention, productive power is the main consideration.

Since MAIP in the present embodiment aims for energy-efficient job assignment, in the following description, the servers are labeled according to their effective energy efficiency. In particular, in the context of MAIP, server i is defined to be more energy-efficient than server j if and only if $\mu_i/(\epsilon_i - \epsilon_i^0) > \mu_j/(\epsilon_j - \epsilon_j^0)$. That is, for any pair of servers i and j, if $i < j$, then $\mu_i/(\epsilon_i - \epsilon_i^0) \geq \mu_j/(\epsilon_j - \epsilon_j^0)$. MAIP in the present embodiment operates by always selecting a server with the highest effective energy efficiency among all servers that contain at least one vacant slot in their buffers, where ties are broken arbitrarily. Advantageously, MAIP in the present embodiment is a simple approach that requires only binary state information (i.e., available or unavailable) from each server for its implementation.

III—Analysis

A. Stochastic Process

Let $\mathcal{N}_j$ denote the set of all states of server j, where the state, $n_j$ is the number of jobs queuing or being served at server j. Thus, $\mathcal{N}_j = \{0, 1, \ldots, B_j\}$, where $B_j \geq 2$ is the buffer size for server j. For server j, states $0, 1, \ldots, B_j - 1$ are called controllable, and the state $B_j$ is called uncontrollable. The set of controllable states for server j, in which the server is available to be tagged, is denoted by $\mathcal{N}_j^{\{0,1\}} = \{0, 1, \ldots, B_j - 1\}$ while, for the uncontrollable state in the set $\mathcal{N}_j^{\{0\}} = \{B_j\}$, the server is forced to be untagged because it cannot accept jobs.

The vector $n = (n_1, n_2, \ldots, n_K)$ represents the state of the multi-queue system, $n_j \in \mathcal{N}_j$, $j \in \mathcal{K}$. The set of all such states n is denoted by $\mathcal{N}$, the sets of uncontrollable and controllable states in $\mathcal{N}$ are, respectively, $$\mathcal{N}^{\{0\}} = \{n \in \mathcal{N} \mid n_j \in \mathcal{N}_j^{\{0\}}, \forall j \in \mathcal{K}\},$$

$$\mathcal{N}^{\{0,1\}} = \{n \in \mathcal{N} \mid n \notin \mathcal{N}^{\{0\}}\}. \quad (1)$$

Define $x^\phi(t) = (X_1^\phi(t), X_2^\phi(t), \ldots, X_K^\phi(t))$ to be a vector of random variables representing the state at time t under policy $\phi$ of the stochastic process of the multi-queue system. Without loss of generality set the initial state $X^\phi(0) = x(0)$, $x(0) \in \mathcal{N}$.

Decisions made on job arrivals rely on the values of $X(t)$ just before an arrival occurs. Use $a_j^\phi(t)$, $j \in \mathcal{K}$ as an indicator of activity at time t under policy $\phi$ so that $a_j^\Phi(t)=1$ if server j is tagged, and $a_j^\Phi(t)=0$ otherwise. Then $$\sum_{j=1}^{K} a_j^\phi(t) \leq 1$$

for all t>0. All job assignment policies considered in the present embodiment are stationary, and so $a_j^\Phi(n)$, $n \in \mathcal{N}$, is used to represent the action to be taken on the stochastic process when the system is in state n. A policy $\phi$ comprises those $a^\Phi(n)=(a_1^\Phi(n), a_2^\Phi(n), \ldots, a_K^\Phi(n))$ for all $n \in \mathcal{N}$.

Define a mapping $R_j: \mathcal{N}_j \to R$, where $R_j(n_j)(n_j \in \mathcal{N}_j)$ is the reward rate of server j in state $n_j$. Let $\mathcal{R}_j$ be the set of all such mappings $R_j$. Then, for a given vector of mappings $R=(R_1, R_2, \ldots, R_K)$, the long-run average reward under policy $\phi$ is defined to be $$\gamma^\phi(R) = \lim_{t \to +\infty} \frac{1}{t} \mathbb{E} \left\{ \int_0^t \sum_{j \in \mathcal{K}} R_j(X_j^\phi(u)) du \right\}. \quad (2)$$

R is referred to as the reward rate function. Along similar lines, consider $\mu_j(n_j)$ and $\epsilon_j(n_j)$, the service rate and energy consumption rate of server j in state $n_j$, respectively, as rewards; that is $\mu_j, \epsilon_j \in \mathcal{R}_j$. As previously defined, $\mu_j(n_j)=\mu_j$, $\epsilon_j(n_j)=\epsilon_j$ for $n_j>0$, $\mu_j(0)=0$ and $\epsilon_j(0)=\epsilon_j^0$, where $\mu_j>0$, $\epsilon_j>\epsilon_j^0 \geq 0$, $j \in \mathcal{K}$. For the vectors $\mu=(\mu_1, \mu_2, \ldots, \mu_K)$ and $\epsilon=(\epsilon_1, \epsilon_2, \ldots, \epsilon_K)$, the long-run average job service rate of the entire system is, then, $\gamma^\Phi(\mu)$ and the long-run average energy consumption rate of the system is $\gamma^\Phi(\epsilon)$. For simplicity, long-run average job service rate and the long-run average energy consumption rate are referred to, in this description, as the job throughput and energy consumption rate, respectively. Since the energy efficiency of the system is the ratio of job throughput to energy consumption rate, the problem of maximizing energy efficiency is encapsulated in $$\max_\phi \frac{\gamma^\phi(\mu)}{\gamma^\phi(\varepsilon)}. \quad (3)$$

Based on the definition given above, MAIP can be formally defined as follows.

$$a_j^{MAIP}(n) = \begin{cases} 1, & n \in \mathcal{N}^{\{0,1\}}, \\ j = \min \arg\max_{j \in \mathcal{K}: n_j \in \mathcal{N}_j^{\{0,1\}}} \frac{\mu_j}{\varepsilon_j - \varepsilon_j^0} \\ 0, & \text{otherwise.} \end{cases} \quad (4)$$

B. Whittle's Index

A well-known index theorem for SFABP was published in 1974 in J. C. Gittins and D. M. Jones, "*A dynamic allocation index for the sequential design of experiments,*" in *Progress in Statistics*, J. Gani, Ed. Amsterdam, NL: North-Holland, 1974, pp. 241-266. The optimal solution for the general multi-armed bandit problem (MABP) was published in 1979 in J. C. Gittins, "*Bandit processes and dynamic allocation indices,*" *Journal of the Royal Statistical Society. Series B (Methodological)*, pp. 148-177, 1979. Relaxing the constraint that only one machine (project/bandit/process) is played at a time, and only the played machine changes state, Whittle, in P. Whittle, "*Restless bandits: Activity allocation in a changing world,*" *J. Appl. Probab.*, vol. 25, pp. 287-298, 1988, published a more general model, the restless multi-armed bandit (RMAB) and proposed as an index the so-called Whittle's index as an approximation for optimality.

The general definition of Whittle's index for the problem of the present embodiment is given here; a closed-form expression will be provided in Section C for the case when job sizes are exponentially distributed.

Based on Theorem 1 provided in Z. Rosberg, Y. Peng, J. Fu, J. Guo, E. W. M. Wong, and M. Zukerman, "*Insensitive job assignment with throughput and energy criteria for processor-sharing server farms,*" *IEEE/ACM Trans. Netw.*, vol. 22, no. 4, pp. 1257-1270, August 2014, there exists a value e*>0, given by $$e^* = \max_\phi \left\{ \frac{\gamma^\phi(\mu)}{\gamma^\phi(\varepsilon)} \right\}, \quad (5)$$

the optimization problem in equation (4) can be written as $$\sup_\phi \left\{ \gamma^\phi(R) : \sum_{j \in \{1,2,\ldots,K\}: X_j^\phi(t) \in \mathcal{N}_j^{\{0,1\}}} a_j^\phi(t) = 1, \forall t \geq 0 \right\} \quad (6)$$

where the reward rate function $R=(R_1, R_2, \ldots, R_K)$, $R_j \in \mathcal{N}_j$, $R_j(n_j)=\mu_j(n_j)-e^*\epsilon_j(n_j)$, $j \in \mathcal{K}$.

Following the Whittle's index approach, the problem in equation (6) can be relaxed as $$\sup_\phi \lim_{t \to +\infty} \frac{1}{t} \mathbb{E} \left\{ \int_0^t \sum_{j \in \mathcal{K}} R_j(X_j^\phi(u)) du \right\}, \quad (7)$$

$$\text{s.t. } \mathbb{E} \left\{ \sum_{j \in \mathcal{K}: X_j^\phi(t) \in \mathcal{N}_j^{\{0,1\}}} a_j^\phi(t) \right\} = 1.$$

This would mean that $a_j^\Phi(t)$ becomes random variables, and so that sometimes more than one server will be tagged simultaneously. This is unrealistic and is not preferable in the present invention.

The linear constraint in equation (8) is covered by the introduction of a Lagrange multiplier $\upsilon$.

$$\inf_\upsilon \sup_\phi \lim_{t \to +\infty} \frac{1}{t} \mathbb{E} \left\{ \int_0^t \left[ \sum_{j \in \mathcal{K}} R_j(X_j^\phi(u)) - \upsilon \sum_{j \in \mathcal{K}: X_j^\phi(t) \in \mathcal{N}_j^{\{0,1\}}} a_j^\phi(u) \right] du \right\} + \upsilon. \quad (8)$$

For a given $\upsilon$, equation (8) can be decomposed into K sub-problems:

$$\sup_\phi \lim_{t \to +\infty} \frac{1}{t} \mathbb{E} \left\{ \int_0^t [R_j(X_j^\phi(u)) - \upsilon a_j^\phi(u)] du \right\}, \quad (9)$$

where $a_j^\phi(u) = 0$ when $X_j^\phi(u) \in \mathcal{N}_j^{\{0\}}$, for $0 < u < t$, $j \in \mathcal{K}$.

In P. Whittle, "*Restless bandits: Activity allocation in a changing world,*" *J. Appl. Probab.*, vol. 25, pp. 287-298, 1988, Whittle defined a υ-subsidy policy for a project (server) as an optimal solution for equation (9), which provides the set of states where the given project will be passive (untagged), and introduced the following definition.

Definition 1. Let D(υ) be the set of passive states of a project under a υ-subsidy policy. The project is indexable if D(υ) increases monotonically from ∅ to the set of all possible states for the project as υ increases from −∞ to +∞.

In particular, if a project (server) j is indexable and there is a υ* satisfying $n_j \notin D(\upsilon)$ for υ≤υ* and $n_j \in D(\upsilon)$ otherwise then this υ* is the value of Whittle's index for project (server) j at state $n_j$. Whittle's index policy for the multi-queue system chooses a controllable server (a server in controllable states) with highest Whittle's index to be tagged (with others untagged) at each decision making epoch.

C. Indexability

The closed form of the optimal solution for equation (9) is given—it is equivalent to the Whittle's index policy for the case with exponentially distributed job sizes. The method of the present embodiment uses the theory of semi-Markov decision processes and the Hamilton-Jacobi-Bellman equation. Formulation in this way requires the exponential job size assumption, but in some embodiments the method of the present invention is not limited to such job size distribution.

Let $V_j^{\phi_j, \upsilon}(n_j, R_j)$ be, for policy $\phi_j$, the expected value of the cumulative reward of a process for server $j \in \mathcal{K}$ that starts from state $n_j \in \mathcal{N}_j$ and ends when it first goes into an absorbing state $n_j^0 \in \mathcal{N}_j$ with reward rate $R_j(n_j) - \upsilon a_j^{\phi_j}(n_j)$. In particular, $V_j^{\phi_j}(n_j^0) = 0$ for any $\phi_j$. Here $\phi_j$ is a stationary policy for server j, which determines whether it is tagged or not according to its current state $X_j^{\phi_j}(t)$. Because state 0 is reachable from all other states, it can be assumed, without loss of generality, that $n_j^0 = 0$ for all $j \in \mathcal{K}$. For this section, define $R_j(n_j) = \mu_j(n_j) - e^* \epsilon_j(n_j)$, $j \in \mathcal{K}$ where e* is defined as in equation (5).

Now, let $\mathcal{P}_j^H$, $j \in \mathcal{K}$ represent a process for server j that starts from state 0 until it reaches state 0 again, where $\phi_j$ is constrained to those policies satisfying $a_j^{\phi_j}(0) = 1$. The set of all such policies is denoted by $\Phi_j^H$. It follows from S. M. Ross, *Applied probability models with optimization applications*. Dover Publications (New York), 1992 that the average reward of process $\mathcal{P}_j^H$ is equivalent to the long-run average reward of the system.

Now an application of the g-revised criterion in M. Ross, *Applied probability models with optimization applications*. Dover Publications (New York), 1992 yields the followed corollary to these two theorems.

Corollary 1. For a server j and a given υ<+∞, let $R_j(n_j) = \mu_j(n_j) - e^* \epsilon_j(n_j) < +\infty$, there exists a real g, with $R_j^g(n_j) = R_j(n_j) - g$ such that if policy $\phi_j^* \in \Phi_j^H$ maximizes $V_j^{\phi_j, \upsilon}(n_j, R_j^g)$ then, $\phi_j^*$ also maximizes the long-run average reward of server j with reward rate $R_j(n_j) - a_j^{\phi_j^*}(n_j)\upsilon$, $n_j \in \mathcal{N}_j$, among all policies in $\Phi_j^H$. In particular, this value of g, denoted by g*, is equivalent to the maximized long-run average reward.

In other words, by comparing the maximized average reward of process $\mathcal{P}_j^H$ under policy $\phi_j^*$ and policy $\phi_j^0$ with $a_j^{\phi_j^0}(0) = 0$ (and all the actions for non-zero states are the same as $\phi_j^*$), then the one with higher average reward is the optimal policy for equation (9). Note that, in the server farm model of the present embodiment, if $a_j^{\phi_j}(0) = 0$, the actions for non-zero states are meaningless since the corresponding server (queue) will never leave state 0.

The first step involves finding $\phi_j^*$. Let $V_j^\upsilon(n_j, R_j^g) = \sup_{\phi_j} V_j^{\phi_j, \upsilon}(n_j, R_j^g)$. The maximization of $V_j^{\phi_j, \upsilon}(n_j, R_j^g)$ can be written, using the Hamilton-Jacobi-Bellman equation, as $$V_j^\upsilon(n_j, R_j^g) = \max\left\{ (R_j^g(n_j) - \upsilon)\tau_j^1(n_j) + \sum_{n \in N_j} P_j^1(n_j, n) V_j^\upsilon(n, R_j^g), \right. \tag{10}$$

$$\left. R_j^g(n_j)\tau_j^0(n_j) + \sum_{n \in N_j} P_j^0(n_j, n) V_j^\upsilon(n, R_j^g) \right\},$$

where $\tau_j^1(n_j)$ and $\tau_j^0(n_j)$, are the expected sojourn time in state $n_j$ for $a_j^{\phi_j}(n_j)=1$, and $a_j^{\phi_j}(n_j)=0$, respectively, and $P^1(n_j, n)$ and $P^0(n_j, n)$, $n_j$, $n \in \mathcal{N}_j$, are the transition probability for $a_j^{\phi_j}(n_j)=1$ and $a_j^{\phi_j}(n_j)=0$, respectively.

For equation (10), there is a specific υ, referred to as $\upsilon_j^*(n_j, R_j^g)$, satisfying $$v_j^*(n_j, R_j^g)\tau_j^1(n_j) = \sum_{n \in N_j} P_j^1(n_j, n)V_j^\upsilon(n, R_j^g) - \tag{11}$$

$$\sum_{n \in N_j} P_j^0(n_j, n)V_j^\upsilon(n, R_j^g) + R_j^g(n_j)(\tau_j^1(n_j) - \tau_j^0(n_j)).$$

For an indexable server j, a policy can be defined as follows:

if $\upsilon < \upsilon_j^*(n_j, R_j^g)$, j will be tagged if $\upsilon > \upsilon_j^*(n_j, R_j^g)$, j will be untagged, and if $\upsilon = \upsilon_j^*(n_j, R_j^g)$, j can be either tagged or untagged. (12)

The $\upsilon^*(n_j, R_j^g)$, $n_j \in \mathcal{N}_j$, $j \in \mathcal{K}$, constitute Whittle's index in this context, and equation (12) defines the optimal solution for equation/problem (9). According to equation (11), although the value of $\upsilon_j^*(n_j, R_j^g)$ may appear to rely on υ, it can be shown that in the present embodiment, the value of $\upsilon_j^*(n_j, R_j^g)$ can be expressed in close form and is independent of υ, and that the server farm in the present embodiment is indexable according to the definition in P. Whittle, "*Restless bandits: Activity allocation in a changing world,*" *J. Appl. Probab.*, vol. 25, pp. 287-298, 1988.

Proposition 1. For the system of the present embodiment defined in Section I, $j \in \mathcal{K}$, $$v_j^*(n_j, R_j^g) = \frac{\lambda(\mu_j - e^*\epsilon_j - g)}{\mu_j}, n_j = 1, 2, \ldots, B_j - 1. \tag{13}$$

The optimal policy, denoted by $\phi_j^*$, that maximizes $V_j^{\phi_j, \upsilon}(n_j, R_j^g)$ also maximizes the average reward of process $\mathcal{P}_j^H$ with the value of g specified in Corollary 1 among all policies in $\Phi_j^H$. For the optimal υ-subsidy policy, it remains to compare $\phi_j^*$ with $a_j^{\phi_j^*}(0)=1$ and $\phi_j^0$ with $a_j^{\phi_j^0}(0)=0$.

Proposition 2. For the system of the present embodiment defined in Section I, $j \in \mathcal{K}$, $$v_j^*(0, R_j^g) = \frac{\lambda}{\mu_j}(\mu_j - e^*\epsilon_j + e^*\epsilon_j^0). \tag{14}$$

The following Proposition 3 is a consequence of Propositions 1 and 2.

Proposition 3. For the system defined in Section I, if job-sizes are exponentially distributed then the Whittle's index of server j at state $n_j$ is:

$$v_j^*(n_j, R_j^g) = \lambda\left(1 - e^{*\frac{\varepsilon_j - \varepsilon_j^0}{\mu_j}}\right), n_j = 0, 1, \ldots, B_j - 1. \quad (15)$$

Evidently then, the system is indexable.

It is clear that the Whittle's index policy, which prioritizes servers with the highest index value at each decision making epoch, is similar to the MAIP method of the present embodiment defined in equation (4), when job sizes are exponentially distributed.

D. Asymptotic Optimality

This section serves to prove the asymptotic optimality of MAIP for the server farm of the present embodiment comprising multiple groups of identical servers, as the numbers of servers in these groups become large and when the job sizes are exponentially distributed (the number of servers is scaled under appropriate and reasonable conditions for large server farms).

The proof methodology disclosed in R. R. Weber and G. Weiss, "On an index policy for restless bandits," *J. Appl. Probab.*, no. 3, pp. 637-648, September 1990 for the asymptotic optimality of index policies is applied to the problem of the present embodiment. However, this proof cannot be directly applied to the present problem because of the presence of uncontrollable states (since buffering spill-over creates dependencies between servers) in the server farm of the present embodiment. In the following, an additional server is defined, designated as server K+1, to handle the blocking case when all original servers are full; this server has only one state (server K+1 never changes state) with zero reward rate. In a preferred embodiment, this is a virtual server that is used only in the proof of the asymptotic optimality in this section. In particular, $|\mathcal{N}_{K+1}^{\{0,1\}}|=1$ and $\mathcal{N}_{K+1}^{\{0\}}=\emptyset$. Also, define $\mathcal{K}^+ = \mathcal{K} \cup \{K+1\}$ as the set of servers including this added zero-reward server. The set of controllable states of these K+1 servers is defined as $\mathcal{N}^{\{0,1\}} = \cup_{j \in \mathcal{K}^+} \mathcal{N}_j^{\{0,1\}}$ and the set of uncontrollable states is $\mathcal{N}^{\{0\}} = \cup_{j \in \mathcal{K}^+} \mathcal{N}_j^{\{0\}}$.

In this section, servers with identical buffer size, service rate, and energy consumption rate are grouped as a server group, and these server groups are labeled as server groups $1, 2, \ldots, \tilde{K}$. For servers $i, j$ of the same server group, $\mathcal{N}_i^{\{0,1\}} = \mathcal{N}_j^{\{0,1\}}$ and $\mathcal{N}_i^{\{0\}} = \mathcal{N}_j^{\{0\}}$. For clarity of presentation, define $\mathcal{N}_i^{\{0,1\}}$ and $\mathcal{N}_i^{\{0\}}$, $i=1, 2, \ldots, \tilde{K}$ as, respectively, the sets of controllable and uncontrollable states of servers in server group i. States for different server groups are regarded as different states, that is, $\mathcal{N}_j^{\{0,1\}} \cap \mathcal{N}_i^{\{0,1\}} = \emptyset$; and $\mathcal{N}_j^{\{0\}} \cap \mathcal{N}_i^{\{0\}} = \emptyset$; for different server groups i and j; i, $j=1, 2, \ldots, \tilde{K}$. Let $Z_i^\Phi(t)$ be the random variable representing the proportion of servers in state $i \in \mathcal{N}^{\{0,1\}} \cup \mathcal{N}^{\{0\}}$ at time t under policy $\phi$. Again, states $i \in \mathcal{N}^{\{0,1\}} \cup \mathcal{N}^{\{0\}}$ are labeled as $1, 2, \ldots, I$, where $I = |\mathcal{N}^{\{0,1\}} \cup \mathcal{N}^{\{0\}}|$ and $Z^\Phi(t)$ is used to denote the random vector $(Z_1^\Phi(t), Z_2^\Phi(t), \ldots, Z_I^\Phi(t))$. Correspondingly, actions $a_j^\Phi(n_j)$, $n_j \in \mathcal{N}_j$, $j \in \mathcal{K}^+$ correspond to actions $a^\Phi(i)$, $i \in \mathcal{N}^{\{0,1\}} \cup \mathcal{N}^{\{0\}}$.

Let z, $z' \in R^I$ be possible values of $Z^\Phi(t)$, $t \geq 0$, $\phi \in \Phi$. Transitions of the random vector $Z^\Phi(t)$ from z to z' can be written as $z' = z + e_{i,i'}$, where $e_{i,i'}$ is a vector of which the ith element is $$+\frac{1}{K+1},$$

the i'th element is $$-\frac{1}{K+1}$$

and otherwise is zero, i, $i' \in \mathcal{N}^{\{0,1\}} \cup \mathcal{N}^{\{0\}}$. In particular, for the server farm of the present embodiment defined in Section I, server j only appears in state $i \in \mathcal{N}_j$; that is, the transition from z to $z' = z + e_{i,i'}$, $i \in \mathcal{N}_j^{\{0,1\}} \cup \mathcal{N}_j^{\{0\}}$, $i' \in \mathcal{N}_{j'}^{\{0,1\}} \cup \mathcal{N}_{j'}^{\{0\}}$ j, j'=1, 2, \ldots, K, j≠j' never occurs. In order to address such impossible transitions, the corresponding transition probabilities are set to zero. Then, order/sort the states $i \in \mathcal{N}^{\{0,1\}}$ according to descending index values, where all states $i \in \mathcal{N}^{\{0\}}$ come after the controllable states, with $a^\Phi(i)=0$ for $i \in \mathcal{N}^{\{0\}}$. Next, set the state $i \in \mathcal{N}_{K+1}^{\{0,1\}}$ of the zero-reward server, which is also a controllable state, to come after all the other controllable states but to precede the uncontrollable states. Because of the existence of the zero-reward server K+1, the number of servers in controllable states can always meet the constraint in equation (7). Note here that the state of server K+1 and the uncontrollable states are manually moved to certain positions without following their indices which are zero. It can be shown that such movements will not affect the long-run average performance of Whittle's index policy, which exists and is equivalent to MAIP in the present embodiment. The position of a state in the ordering i=1, 2, . . . , I is also defined as its label.

Let $\gamma^{OR}(\phi)$ be the long-run average reward of the original problem in equation (6) under policy $\phi$, and $\gamma^{LR}(\phi)$ be the long-run average reward of the relaxed problem in equation (7) under policy $\phi$. In addition, let $$\gamma^{OR} = \max_\phi \{\gamma^{OR}(\phi)\},$$

the maximal long-run average reward of the original problem, and $$\gamma^{LR} = \max_\phi \{\gamma^{LR}(\phi)\},$$

the maximal long-run average reward of the relaxed problem. From the definition of the system of the present embodiment, $\gamma^{LR}(\phi)/K$, $\gamma^{OR}(\phi)/K \leq \max_{j \in \delta+, n_j \in \mathcal{N}_j} R_j(n_j) < +\infty$, where $R_j(n_j)$ is the reward rate of server j in state $n_j$ as defined before. Then, $\gamma^{OR}(\text{index})/K \leq \gamma^{OR}/K \leq \gamma^{LR}/K$ is obtained. It can be proved that, under Whittle's index policy, $\gamma^{OR}(\text{index})/K - \gamma^{OR}/K \to 0$ when K is scaled in a certain way.

To demonstrate the asymptotic optimality, the following describes the stationary policies, including Whittle's index policy, in another way. Let $\mu_i^\Phi(z) \in [0,1]$, $z \in R^I$, i=1, 2, . . . , I, be the probability for a server in state $i \in \mathcal{N}^{\{0,1\}} \cup \mathcal{N}^{\{0\}}$ to be tagged ($a^\Phi(i)=1$) when $Z^\Phi(t)=z$. Then, $1-\mu_i^{100}(z)$ is the probability for a server in state i to be untagged ($a^\Phi(i)=0$).

Define $\mathcal{N}_i^+$, $i \in \mathcal{N}^{\{0,1\}} \cup \mathcal{N}^{\{0\}}$ as the set of states that precede state i in the ordering. Then, for Whittle's index policy, obtain $$u_i^{index}(z) = \frac{1}{z_i} \min\left\{z_i, \max\left\{0, \frac{1}{K+1} - \sum_{i' \in \mathcal{N}_i^+} z_{i'}\right\}\right\}. \quad (16)$$

The multi-queue system of the present embodiment is stable, since any stationary policy will lead to an irreducible Markov chain for the associated process and the number of states is finite. Then, for a policy $\phi \in \Phi$, the vector $X^\phi(t)$ converges as $t \to \infty$ in distribution to a random vector $X^\phi$. In the equilibrium region, let $\pi_j^\phi$ be the steady state distribution of $X_j^\phi$ for server $j$, $j \in \mathcal{K}^+$, under policy $\phi \in \Phi$, where $\pi_j^\phi(i)$, $i \in \mathcal{N}_j$, is the steady state probability of state i. For clarity of presentation, extend vector $\pi_j^\phi$ to a vector of length I, written $\tilde{\pi}_j^\phi$, of which the ith element is $\pi_j^\phi(i)$, if $i \in \mathcal{N}_j$, and otherwise, 0. The long-run expected value of $Z^\phi(t)$ is $$\sum_{j=1}^{K+1} \tilde{\pi}_j^\phi / (K+1).$$

In the server farm embodiment defined in Section I, the long-run expected value of $Z^\phi(t)$ should be a member of the set $$Z = \left\{ z \in R^I \mid \sum_{i \in \tilde{N}^{\{0,1\}} \cup \tilde{N}^{\{0\}}} z_i \equiv 1, \forall i \in \tilde{N}^{\{0,1\}} \cup \tilde{N}^{\{0\}}, z_i \geq 0 \right\}. \quad (17)$$

Define $q^1(z, z_i, z_i')$ and $q^0(z, z_i, z_i')$, $z \in \mathcal{Z}$, $i \in \tilde{N}^{\{0,1\}} \cup \tilde{N}^{\{0\}}$, as the average transition rate of the ith element in vector z from $z_i$ to $z_i'$, under tagged and untagged action, respectively. Then, the average transition rate of the ith element of z under policy $\phi$ is given by $$q^\phi(z, z_i, z_i') = \mu_i^\phi(z) q^1(z, z_i, z_i') + (1 - \mu_i^\phi(z)) q^0(z, z_i, z_i'). \quad (18)$$

Consider the following differential equation for a stochastic process, denoted by:

$$\frac{dz_i^\phi(t)}{dt} = \sum_{z_i'} \left[ z_i'(t) q^\phi\left(z^\phi(t), z_i', z_i^\phi(t)\right) - z_i^\phi(t) q^\phi\left(z^\phi(t), z_i^\phi(t), z_i'\right) \right]. \quad (19)$$

Because of the global balance at an equilibrium point of $$\lim_{t \to +\infty} \int_0^t z^\phi(u) du / t,$$

if exists, denoted by $z^\phi$, $dz^\phi(t)/dt|_{z^\phi(t)=z^\phi}=0$. Let OPT represent the optimal solution of the relaxed problem (7) and recall that index represents the Whittle's index policy. Since $\mu_i^{index}(z^{index}) = \mu_i^{OPT}(z^{index})$, following the proof of Theorem 2 in R. R. Weber and G. Weiss, "On an index policy for restless bandits" J. Appl. Probab., no. 3, pp. 637-648, September 1990, it can be determined that $dz^{OPT}(t)/dt|_{z^{OPT}(t)=z^{index}}=0$ and $z^{index}=z^{OPT}$, if both $z^{index}$ and $z^{OPT}$ exist. The existence of $z^{index}$ and $z^{OPT}$ will be discussed later.

For a small $\delta > 0$, define $\overline{R}^{\delta,\phi}$ to be the average reward rates during the time period $|z^\phi(t)-z^\phi| \leq \delta$ under policy $\phi$, and $$\frac{R_m}{K} = \sup_\phi \limsup_{t \to +\infty} \left| \frac{R(X^\phi(t))}{K} \right| < +\infty$$

is an upper bound of the absolute value of the reward rate divided by K. Then, $$\frac{\gamma^{LR}}{K} - \frac{\gamma^{OR}(\text{index})}{K} \leq \quad (20)$$

$$\lim_{\delta \to 0} \lim_{t \to +\infty} \frac{1}{t} \int_0^t \left[ \frac{R_m}{K} P\{|z^{OPT}(u) - z^{OPT}| > \delta\} + \frac{R_m}{K} P \right.$$

$$\{|z^{index}(u) - z^{index}| > \delta\} + \frac{\overline{R}^{\delta,OPT}}{K} P\{|z^{OPT}(u) - z^{OPT}| \leq$$

$$\left. \delta\} - \frac{\overline{R}^{\delta,index}}{K} P\{|z^{index}(u) - z^{index}| \leq \delta\} \right] du.$$

The server farm is decomposed into $\tilde{K}$ server groups, with number of servers in the ith group denoted by $K_i$, $i=1, 2, \ldots, \tilde{K}$. Then, $$K = \sum_{i=1}^{\tilde{K}} K_i.$$

Based on the proof provided in R. R. Weber and G. Weiss, "On an index policy for restless bandits," J. Appl. Probab., no. 3, pp. 637-648, September 1990, for any $K_i = K_i^0 n$, $K_i^0 = 1, 2, \ldots$, $i=1, 2, \ldots, \tilde{K}$, $n=1, 2, \ldots$, $\delta > 0$ and $\phi$ is set to be either index or OPT, $$\lim_{n \to +\infty} \lim_{t \to +\infty} \frac{1}{t} \int_0^t P\{|Z^\phi(u) - z^\phi(u)| > \delta\} du = 0 \quad (21)$$

Then, as $n \to +\infty$, the existence of an equilibrium point of $$\lim_{t \to +\infty} \int_0^t Z^\phi(u) du / t$$

leads to the existence of $$z^\phi = \lim_{t \to +\infty} \int_0^t z^\phi(u) du / t$$

(using the Lipschitz continuity of the right side of Equation (17) as a function of $z^\phi(t)$). The following is obtained:

$$\lim_{n \to +\infty} \lim_{\delta \to 0} \left( \frac{\overline{R}^{\delta,OPT}}{K} - \frac{\overline{R}^{\delta,index}}{K} \right) = 0, \quad (22)$$

and $$\lim_{n \to +\infty} \left( \frac{\gamma^{LR}}{K} - \frac{\gamma^{OR}(\text{index})}{K} \right) = 0. \quad (23)$$

Finally, $\gamma^{OR}(\text{index})/K - \gamma^{OR}/K \to 0$ as $n \to +\infty$, that is, MAIP (Whittle's index policy) approaches the optimal solution in terms of energy efficiency as the number of servers in each server group tends to infinity at the appropriate rate.

IV—Numerical Results

In this section, the performance of the MAIP method of the present embodiment is evaluated by extensive numerical results obtained by simulation. All results in the following are presented in the form of an observed mean from multiple independent runs of the corresponding experiment. The confidence intervals at the 95% level based on the Student's t-distribution are maintained within ±5% of the observed mean. For convenience of describing the results, given two numerical quantities x>0 and y>0, the relative difference of x to y is defined as (x−y)/y.

In all experiments performed, a system of servers divided into three server groups were utilized. Servers in each server group i, i=1, 2, 3, have the same buffer size, service rate, and energy consumption rate, denoted by $\bar{B}_i$, $\bar{\mu}_i$, $\bar{\epsilon}_i$ and $\bar{\epsilon}_i^0$, respectively. This can be considered as a realistic setting since in practice a server farm is likely to comprise multiple servers of the same type purchased at a time. If not otherwise specified, in the present embodiment job sizes are assumed to be exponentially distributed. Recall that the job throughput is the average job departure rate (jobs per second), the power consumption is the average energy consumption rate (Watt), and the energy efficiency is the ratio of job throughput to power consumption (jobs per Watt second). Also, the average job size has been normalized to one (Byte).

A. Effectiveness of Idle Power

To demonstrate the effect of idle power on job assignment, the following compares the MAIP method with a baseline method. The baseline method used is the "Most energy-efficient available server first Neglecting Idle Power" (MNIP) job assignment method. As its name suggests, the MNIP method neglects idle power and hence treats $\epsilon_j^0=0$ for all $j \in \mathcal{K}$ in the process of selecting servers for job assignment. The following compares MAIP with MNIP in terms of energy efficiency, job throughput, and energy consumption rate under various system parameters.

Figures 4A, 4B:
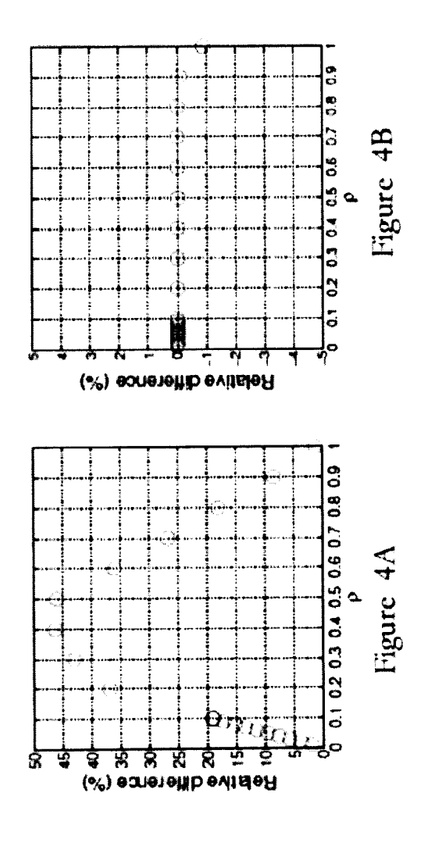
FIG. 4A is a graph of simulation results showing a relative difference in energy efficiency of a server farm implementing the MAIP job assignment method in one embodiment of the present invention to energy efficiency of a server farm implementing a most-energy-efficient-available-server-first neglecting idle power (MNIP) job assignment method.
FIG. 4B is a graph of simulation results showing job throughput of a server farm implementing the MAIP job assignment method in one embodiment of the present invention and that of a server farm implementing the MNIP job assignment method.
Figure 4C:
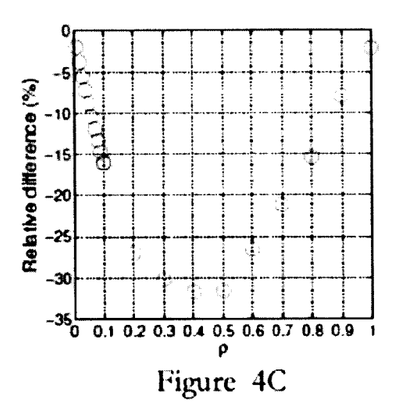
FIG. 4C is a graph of simulation results showing a relative difference in energy consumption rate of a server farm implementing the MAIP job assignment method in one embodiment of the present invention to a server farm implementing the MNIP job assignment method.

For the set of experiments in FIGS. 4A-4C, each server group has 15 servers, and where $\bar{B}_i=10$, $\bar{\epsilon}_i^0/\bar{\epsilon}_i=0.4i-0.3$ for i=1, 2, 3. $\bar{\mu}_i$ and $\bar{\epsilon}_i$ are randomly generated with $\bar{\mu}_1=6.86$, $\bar{\epsilon}_1=6.86$, $\bar{\mu}_2=3.64$, $\bar{\epsilon}_2=3.72$, $\bar{\mu}_3=2.87$, and $\bar{\epsilon}_3=3.15$. The normalized offered traffic ρ is varied from 0.01 to 0.9.

FIGS. 4A-4C show, by simulation, the comparison of MAIP method to MNIP method in terms of energy efficiency (FIG. 4A), job throughput (FIG. 4B), and energy consumption rate (FIG. 4C). It can be observed from FIG. 4B that in all cases, both methods have almost the same performance in job throughput. It can also be observed from FIGS. 4A and 4C that, in the case where ρ→0 and ρ→1, the two methods are close to each other in terms of both energy efficiency and power consumption. This may be because in such trivial and extreme cases the system is at all times either almost empty or almost fully occupied. However, in the realistic cases where ρ is not too large and not too small, MAIP significantly outperforms MNIP with a gain of over 45% in energy efficiency at ρ=0.4, 0.5.

Figures 5A, 5B:
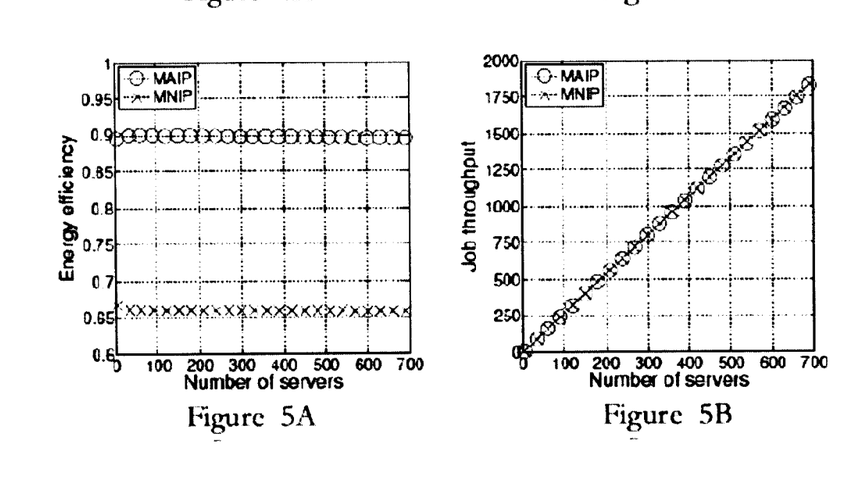
FIG. 5A is a graph of simulation results showing energy efficiency against the number of servers in a server farm implementing the MAIP job assignment method in one embodiment of the present invention and in a server farm implementing the MNIP job assignment method (with normalized offered traffic $\rho=0.6$)
FIG. 5B is a graph of simulation results showing job throughput against the number of servers in a server farm implementing the MAIP job assignment method in one embodiment of the present invention and in a server farm implementing the MNIP job assignment method (with normalized offered traffic $\rho=0.6$)
Figure 5C:
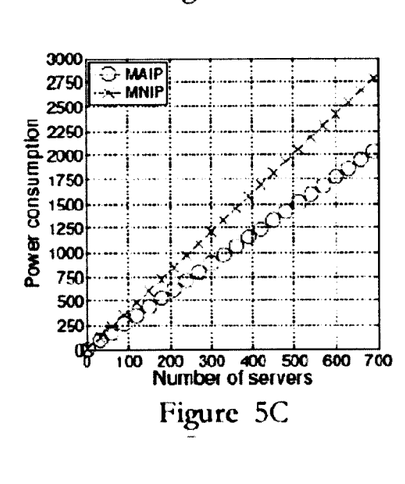
FIG. 5C is a graph of simulation results showing energy consumption rate against the number of servers in a server farm implementing the MAIP job assignment method in one embodiment of the present invention and in a server farm implementing the MNIP job assignment method (with normalized offered traffic $\rho=0.6$)

The same settings as that for obtaining the results in FIGS. 4A-4C are used to obtain FIGS. 5A-5C, except that for FIGS. 5A-5C, ρ is fixed at 0.6 and the number of servers K is varied from 3 to 690. In this example, K is increased by increasing the number of servers in each of the three server groups. It can be observed from FIG. 5B that, under such a medium traffic load, the service capacity is sufficiently large, so that with both MAIP and MNIP almost all jobs can be admitted and hence the job throughput is almost identical to the arrival rate for all values of K. As a result, the job throughput increases almost linearly with respect to the number of servers K. On the other hand, it can be observed from FIG. 5C that, for both methods, the power consumption also increases almost linearly with respect to the number of servers K. As seen in FIG. 5A, however, the power consumption of MAIP increases at a significantly smaller rate than that of MNIP, which results in a substantial improvement of the energy efficiency by nearly 36% in all cases.

Figure 6A:
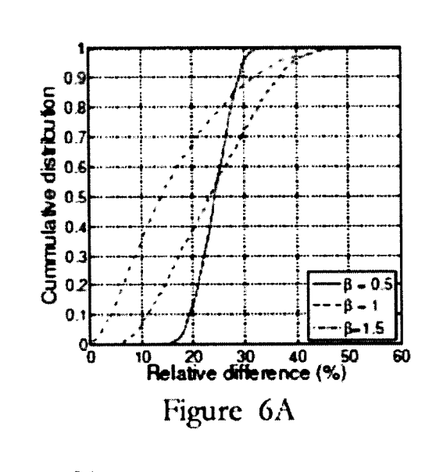
FIG. 6A is a graph of simulation results showing a cumulative distribution function of a relative difference of energy efficiency of a server farm implementing the MAIP job assignment method in one embodiment of the present invention to energy efficiency of a server farm implementing the MNIP job assignment method, for different server heterogeneity $\beta$ (with normalized offered traffic $\rho=0.4$)
Figure 6B:
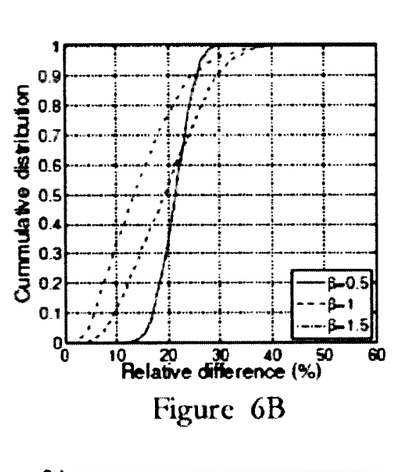
FIG. 6B is a graph of simulation results showing a cumulative distribution function of a relative difference of energy efficiency of a server farm implementing the MAIP job assignment method in one embodiment of the present invention to energy efficiency of a server farm implementing the MNIP job assignment method, for different server heterogeneity $\beta$ (with normalized offered traffic $\rho=0.6$)
Figure 6C:
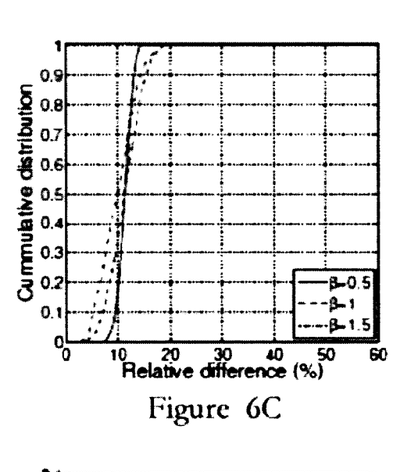
FIG. 6C is a graph of simulation results showing a cumulative distribution function of a relative difference of energy efficiency of a server farm implementing the MAIP job assignment method in one embodiment of the present invention to energy efficiency of a server farm implementing the MNIP job assignment method, for different server heterogeneity $\beta$ (with normalized offered traffic $\rho=0.8$)

For the set of experiments for FIGS. 6A-6C, each server group has 15 servers, and where $\bar{B}_i=10$ for i=1, 2, 3. A parameter β is introduced, where different values of β lead to different levels of server heterogeneity. In the present example, three different values for β are considered, i.e., β=0.5, 1, 1.5. Set $\bar{\epsilon}_i^0/\bar{\epsilon}_i=(0.4i-0.3)^\beta 0$ for i=1, 2, 3. The set of service rates $\bar{\mu}_i$ are randomly generated from the range [1, 10] and are arranged in a non-increasing order, i.e., $\bar{\mu}_1 \geq \bar{\mu}_2 \geq \bar{\mu}_3$. For the set of energy consumption rates $\bar{\epsilon}_i$, two real numbers $\bar{a}_1$ and $\bar{a}_2$ are chosen randomly from [0.5, 1]. Then, with $\bar{\mu}_1/\bar{\epsilon}_1=200$, set $\bar{\mu}_i/\bar{\epsilon}_i=\bar{a}_{i-1}{}^\beta \bar{\mu}_{i-1}/\bar{\epsilon}_{i-1}$ for i=2, 3.

The results of FIGS. 6A-6C are obtained from 1000 experiments and are plotted in the form of cumulative distribution of the relative difference of MAIP to MNIP in terms of the energy efficiency. It can be observed from FIGS. 6A-6C that MAIP significantly outperforms MNIP by up to 60%. It can also be observed from FIGS. 6A and 6B that MAIP outperforms MNIP by more than 10% in nearly 100% of the experiments for the case β=0.5. In addition, it can be observed from FIGS. 6A-6C that as the level of server heterogeneity (i.e., the value of β) becomes higher, the performance improvement of MAIP over MNIP in general becomes larger, although the gain is decreasing when the normalized offered traffic ρ approaches 0.8, similar to what is observed in FIG. 4A.

B. Effect of Jockeying Cost

MAIP in the present embodiment is designed as a non-jockeying policy, which is more appropriate than jockeying policies for job assignment in a large-scale server farm. In general, jockeying policies suit a small server farm where the cost associated with jockeying is negligible. In large-scale systems, the cost associated with jockeying can be significant and may have a snowball effect on the system performance. The following demonstrates the benefits of MAIP in a server farm where jockeying costs are high, by comparing it with a jockeying policy known as Most Energy Efficient Server First (MEESF) proposed in J. Fu, J. Guo, E. W. M. Wong, and M. Zukerman, "*Energy-efficient heuristics for insensitive job assignment in processor sharing server farms,*" IEEE J. Sel. Areas Commun., vol. 33, no. 12, pp. 2878-2891, December 2015.

The settings of servers in each of the three server groups are based on the benchmark results of Dell PowerEdge rack servers R610 (August 2010), R620 (May 2012) and R630 (April 2015). Specifically, $\bar{\mu}_3$ and $\bar{\epsilon}_3$ is normalised to one, and the following settings are applied: $\bar{\mu}_1/\bar{\mu}_3=3.5$, $\bar{\epsilon}_1/\bar{\epsilon}_3=1.2$, $\bar{\epsilon}_1^0/\bar{\epsilon}_1=0.2$, $\bar{\mu}_2/\bar{\mu}_3=1.4$, $\bar{\epsilon}_2/\bar{\epsilon}_3=1.1$, $\bar{\epsilon}_2^0/\bar{\epsilon}_2=0.2$, and $\bar{\epsilon}_3^0/\bar{\epsilon}_3=0.3$. Also, set $\bar{B}_i=10$ for i=1, 2, 3, and ρ=0.6. The number of servers K is varied from 3 to 270, where K is increased by increasing the number of servers in each of the three server groups.

Figure 7A:
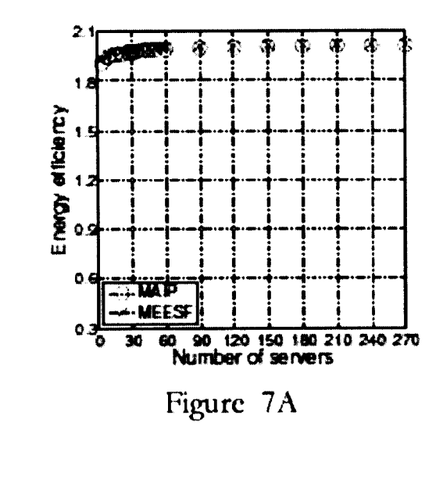
FIG. 7A is a graph of simulation results showing energy efficiency against the number of servers in a server farm implementing the MAIP job assignment method in one embodiment of the present invention and in a server farm implementing the Most Energy Efficient Server First (MEESF) job assignment method (with suspension period $\Delta=0$)
Figure 7B:
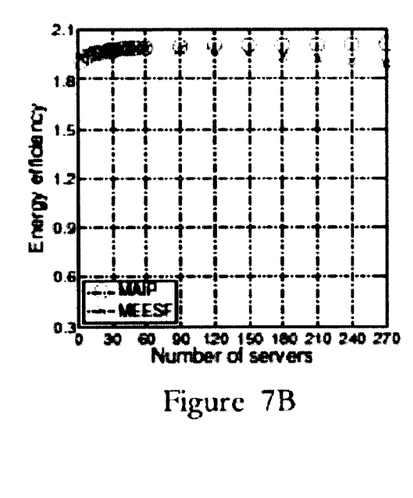
FIG. 7B is a graph of simulation results showing energy efficiency against the number of servers in a server farm implementing the MAIP job assignment method in one embodiment of the present invention and in a server farm implementing the MEESF job assignment method (with suspension period $\Delta=0.0005$)

In the present example, assume that each jockeying action incurs a (constant) delay Δ. That is, when a job is reassigned from server i to server j, it will be suspended for a period Δ before resumed on server j. Clearly, when Δ>0, this is equivalent to increasing the size of the job and hence its service requirement. Accordingly, for a given system, a non-zero cost per jockeying action indeed increases the traffic load. In the present example, three different values of Δ are considered. The case where Δ=0 is for zero jockeying cost, the case where Δ=0.0005 indicates a relatively small cost per jockeying action, and the case where Δ=0.01 represents a large cost per jockeying action. The results are presented in FIGS. 7A-7C for the energy efficiency and in FIGS. 8A-8C for the job throughput.

Figure 8A:
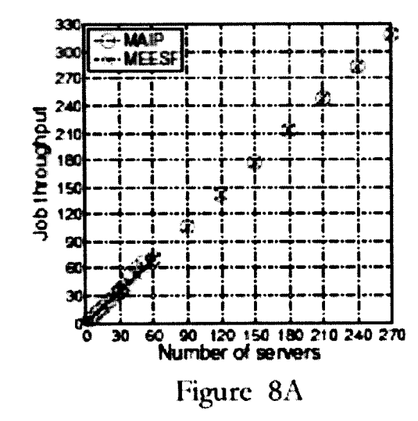
FIG. 8A is a graph of simulation results showing job throughput against the number of servers in a server farm implementing the MAIP job assignment method in one embodiment of the present invention and in a server farm implementing the Most Energy Efficient Server First (MEESF) job assignment method (with suspension period $\Delta=0$)

For the case where Δ=0, it can be observed that FIG. 8A is similar to FIG. 5B. That is, under a medium traffic load, the service capacity is sufficiently large, so that both MAIP and MEESF yield a job throughput that is almost identical to the arrival rate for all values of K. It can be observed from FIG. 7A that, in this case, MEESF consistently outperforms MAIP in terms of the energy efficiency, even though for a very small margin.

Figure 8B:
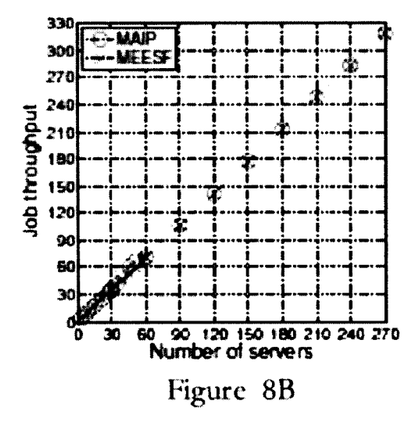
FIG. 8B is a graph of simulation results showing job throughput against the number of servers in a server farm implementing the MAIP job assignment method in one embodiment of the present invention and in a server farm implementing the Most Energy Efficient Server First (MEESF) job assignment method (with suspension period $\Delta=0.0005$)

For the case where Δ=0.0005, it can be observed from FIG. 8B that, since the cost per jockeying action is relatively small, the service capacity is sufficiently large so that the job throughput of MEESF is not affected. It can also be observed from FIG. 7B that, when the number of servers K is small, the energy efficiency of MEESF is better than that of MAIP, but when the number of servers K is large, the energy efficiency of MEESF is clearly degraded. This is because, as K increases, the number of jockeying actions required for a job on average increases. With a non-zero cost per jockeying action, it can substantially increase the power consumption, since it is required to use more of those less energy-efficient servers to meet the increased traffic load.

Figure 7C:
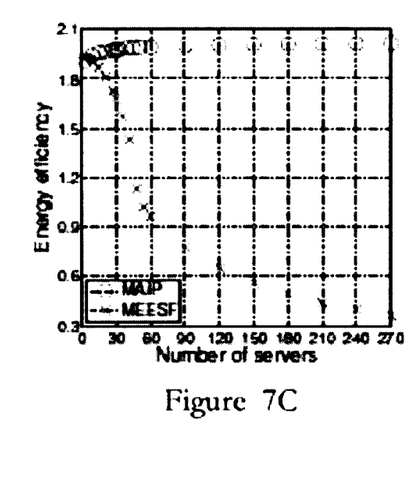
FIG. 7C is a graph of simulation results showing energy efficiency against the number of servers in a server farm implementing the MAIP job assignment method in one embodiment of the present invention and in a server farm implementing the MEESF job assignment method (with suspension period $\Delta=0.01$)
Figure 8C:
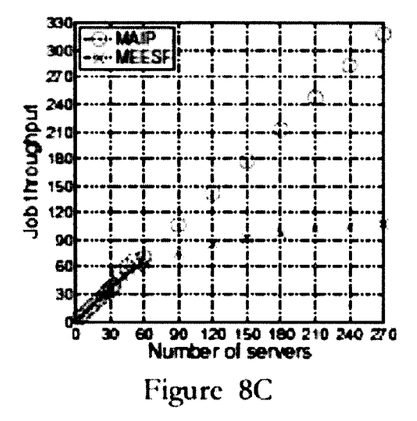
FIG. 8C is a graph of simulation results showing job throughput against the number of servers in a server farm implementing the MAIP job assignment method in one embodiment of the present invention and in a server farm implementing the Most Energy Efficient Server First (MEESF) job assignment method (with suspension period $\Delta=0.01$)

The effect is more profound when Δ is increased to 0.01. In this case, as shown in FIGS. 7C and 8C, the cost associated with jockeying is so high that both the job throughput and the energy efficiency of MEESF are significantly degraded, due to the substantially increased traffic load.

C. Sensitivity to Job-Size Distributions

The workload characterizations of many computer science applications, such as Web file sizes, IP flow durations, and the lifetimes of supercomputing jobs, are shown to exhibit heavy-tailed Pareto distributions. To determine whether the performance of MAIP is sensitive to the job-size distribution, three different distributions, in addition to the exponential distribution, are considered in the following. These distributions are deterministic, Pareto with the shape parameter set to 2.001 (Pareto-1 for short), and Pareto with the shape parameter set to 1.98 (Pareto-2 for short). In all cases, the mean was set to be one.

Figure 9A:
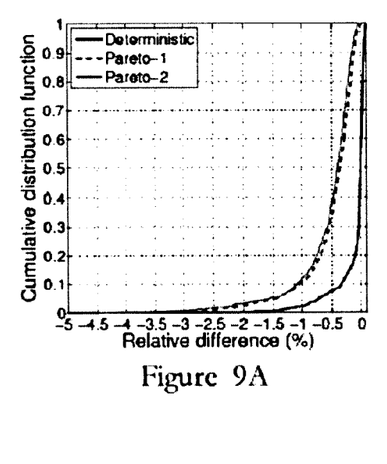
FIG. 9A is a graph of simulation results showing a cumulative distribution function of a relative difference of energy efficiency in a server farm implementing the MAIP job assignment method in one embodiment of the present invention, by comparing different job-size distribution to an exponential distribution (with normalized offered traffic $\rho=0.4$ and server heterogeneity $\beta=1$)
Figure 9B:
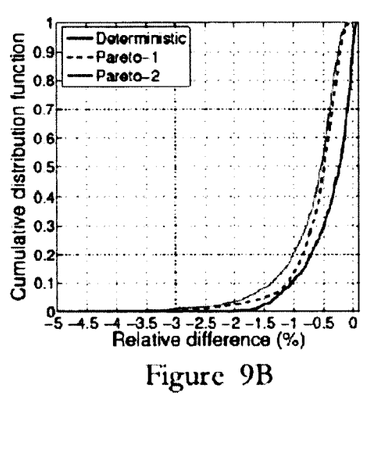
FIG. 9B is a graph of simulation results showing a cumulative distribution function of a relative difference of energy efficiency of a server farm implementing the MAIP job assignment method in one embodiment of the present invention, by comparing different job-size distribution to an exponential distribution (with normalized offered traffic $\rho=0.6$ and server heterogeneity $\beta=1$)
Figure 9C:
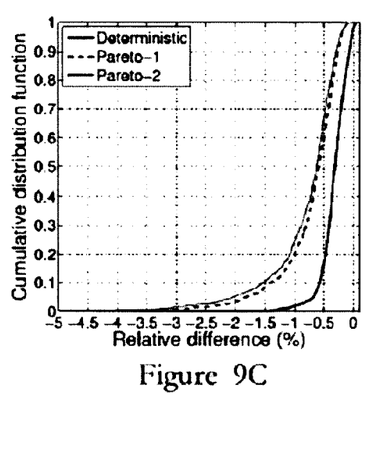
FIG. 9C is a graph of simulation results showing a cumulative distribution function of a relative difference of energy efficiency of a server farm implementing the MAIP job assignment method in one embodiment of the present invention, by comparing different job-size distribution to an exponential distribution (with normalized offered traffic $\rho=0.8$ and server heterogeneity $\beta=1$).

The same settings as that for obtaining the results in FIGS. 6A-6C are used to obtain FIGS. 9A-9C, with β=1. In each experiment, the energy efficiencies for MAIP in each case are obtained, and the relative differences of the one using each corresponding distribution to the one using the exponential distribution are computed. FIGS. 9A-9C plot the cumulative distribution of the relative difference results obtained from the 1000 experiments for each particular value of the normalized offered traffic. It can be observed from FIGS. 9A-9C that all relative difference results are between −5% and 0. As the confidence intervals of these simulation results are maintained within ±5% of the observed mean with a 95% confidence level, the energy efficiency of MAIP is not very sensitive to job-size distribution.

V—Conclusion

The embodiments of the MAIP job assignment method in the present invention as broadly described above address job assignment problem in a server farm comprising multiple processor sharing servers with different service rates, energy consumption rates and buffer sizes. The MAIP method in embodiments of the present invention takes into account of idle power, and can maximize the energy efficiency of the entire system, defined as the ratio of the long-run average throughput to the long-run average energy consumption rate, by effectively assigning jobs/requests to these servers.

Advantageously, the MAIP method only requires information of full/non-full states of servers, and can be implemented by using a binary variable for each server. Also, this method does not require any estimation or prediction of average arrival rate. MAIP has been proven to approach optimality as the numbers of servers in server groups tend to infinity and when job sizes are exponentially distributed. This asymptotic property is particularly appropriate to a large-scale server farm that is likely to purchase and upgrade a large number of servers with the same style and attributes at the same time. Also, the MAIP method is highly energy efficient in cases of exponential and Pareto job-size distributions, and so it is suitable for a server farm with highly varying job sizes. MAIP is also more appropriate than MEESF for a server farm with non-zero jockeying cost, and it is useful for a real large-scale system which has significant cost for job reassignment. Various other advantages of the methods of the present invention can be determined by a person skilled in the art upon considering the above description and the referenced drawings.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for operating a server farm with a plurality of servers operably connected with each other, the method comprising the steps of:

receiving a job request of a computational task to be handled by the server farm;

determining, from the plurality of servers, one or more servers operable to accept the job request;

determining a respective effective energy efficiency value associated with at least the one or more servers, the respective effective energy efficiency value of the servers being defined by: a service rate of the respective server divided by a difference between an energy consumption rate value when the respective server is busy and an energy consumption rate value when the respective server is idle; and assigning the computational task to a server with the highest effective energy efficiency value;

for maximizing energy efficiency of the server farm, defined by a ratio of a long-run expected throughput divided by an expected energy consumption rate value.

2. The method in accordance with claim 1, further comprising the step of:

sorting the one or more servers according to the respective determined effective energy efficiency values.

3. The method in accordance with claim 1, wherein the step of determining from the plurality of servers one or more servers operable to accept the job request comprises determining, from the plurality of servers, all servers operable to accept the job request.

4. The method in accordance with claim 1, wherein the plurality of servers cannot be powered off during operation of the server farm.

5. The method in accordance with claim 1, wherein assignment of computation tasks in the server farm is substantially independent of an arrival rate of computation tasks at the server farm.

6. The method in accordance with claim 1, wherein assignment of computation tasks in the server farm is substantially independent of a respective size of the computation tasks received at the server farm.

7. The method in accordance with claim 1, wherein the plurality of servers each includes a finite buffer for queuing job requests.

8. The method in accordance with claim 7, wherein the one or more servers operable to accept the job request each has at least one vacancy in their respective buffer.

9. The method in accordance with claim 1, wherein the server farm is heterogeneous in that the plurality of servers can have different server speeds, energy consumption rates, and/or buffer sizes.

10. The method in accordance with claim 1, wherein the server farm is a non-jockeying server farm in which computational task being handled by one of the plurality of servers cannot be reassigned to other servers.

11. A server farm comprising:

a plurality of servers operably connected with each other;

one or more processor operably connected with the plurality of server, the one or more processor being arranged to receive a job request of a computational task to be handled by the server farm;

determine, from the plurality of servers, one or more servers operable to accept the job request;

determine a respective effective energy efficiency value associated with at least the one or more servers, the respective effective energy efficiency value being defined by: a service rate of the respective server divided by a difference between an energy consumption rate value when the respective server is busy and an energy consumption rate value when the respective server is idle; and assign the computational task to a server with the highest effective energy efficiency value;

for maximizing energy efficiency of the server farm, defined by a ratio of a long-run expected throughput divided by an expected energy consumption rate value.

12. The server farm in accordance with claim 11, wherein the one or more processor is further operable to:

sort the one or more servers according to the respective determined effective energy efficiency values.

13. The server farm in accordance with claim 11, wherein the one or more processor is further operable to: determine, from the plurality of servers, all servers operable to accept the job request.

14. The server farm in accordance with claim 11, wherein the plurality of servers cannot be powered off during operation of the server farm.

15. The server farm in accordance with claim 11, wherein the one or more processor is arranged such that assignment of computation tasks in the server farm is substantially independent of an arrival rate of computation tasks at the server farm.

16. The server farm in accordance with claim 11, wherein the one or more processor is arranged such that assignment of computation tasks in the server farm is substantially independent of a respective size of the computation tasks received at the server farm.

17. The server farm in accordance with claim 11, wherein the plurality of servers each includes a finite buffer for queuing job requests; and wherein the one or more servers operable to accept the job request each has at least one vacancy in their respective buffer.

18. The server farm in accordance with claim 11, wherein the server farm is heterogeneous in that the plurality of servers can have different server speeds, energy consumption rates, and/or buffer sizes.

19. The server farm in accordance with claim 11, wherein the server farm is a non-jockeying server farm in which computational task being handled by one of the plurality of servers cannot be reassigned to other servers.

20. The server farm in accordance with claim 11, wherein the one or more processors are incorporated in at least one of the plurality of servers.

* * * * *

UNITED STATES PATENT AND TRADEMARK OFFICE
CERTIFICATE OF CORRECTION

PATENT NO. : 9,959,149 B1
APPLICATION NO. : 15/290106
DATED : May 1, 2018
INVENTOR(S) : Jing Fu et al.

It is certified that error appears in the above-identified patent and that said Letters Patent is hereby corrected as shown below:

On the Title Page

Item (72):
The inventor identified as William Morgan is corrected to be William Moran.

Signed and Sealed this
Sixth Day of November, 2018

Andrei Iancu
*Director of the United States Patent and Trademark Office*